US011229946B2

(12) United States Patent
Ogura et al.

(10) Patent No.: US 11,229,946 B2
(45) Date of Patent: Jan. 25, 2022

(54) WATER INJECTION AND KNEADING SYSTEM FOR GREEN MOLDING SAND

(71) Applicant: SINTOKOGIO, LTD., Nagoya (JP)

(72) Inventors: Yuichi Ogura, Toyokawa (JP); Hisashi Harada, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 264 days.

(21) Appl. No.: 16/481,440

(22) PCT Filed: Nov. 16, 2017

(86) PCT No.: PCT/JP2017/041285
§ 371 (c)(1),
(2) Date: Jul. 26, 2019

(87) PCT Pub. No.: WO2018/154881
PCT Pub. Date: Aug. 30, 2018

(65) Prior Publication Data
US 2019/0358697 A1    Nov. 28, 2019

(30) Foreign Application Priority Data
Feb. 24, 2017    (JP) .............................. JP2017-032751

(51) Int. Cl.
*B22C 5/04* (2006.01)
*B22C 5/14* (2006.01)
*B22C 5/18* (2006.01)

(52) U.S. Cl.
CPC .................. *B22C 5/0472* (2013.01)

(58) Field of Classification Search
CPC ....... B22C 5/04; B22C 5/0409; B22C 5/0472; B22C 5/14; B22C 5/18; G01N 27/04
(Continued)

(56) References Cited

U.S. PATENT DOCUMENTS 2,958,107 A    11/1960    Hartley
4,780,665 A *  10/1988    Mitchell ................... B22C 5/00
                                                           324/695
(Continued)

FOREIGN PATENT DOCUMENTS

CN    102621189 A    8/2012
CN    202857464 U    4/2013
(Continued)

OTHER PUBLICATIONS

Mar. 24, 2021 Office Action issued in Chinese Patent Application No. 201780087315.6.
(Continued)

*Primary Examiner* — Kevin P Kerns
(74) *Attorney, Agent, or Firm* — Oliff PLC

(57) ABSTRACT

A water supply and kneading system for green sand, including: a weighing hopper that stores green sand that has been weighed; a kneading machine that kneads the green sand and water; a sand loading means for releasing the green sand in the weighing hopper into the kneading machine, or shutting off the release; a water supply device that supplies water to the green sand in the kneading machine; a moisture sensor that includes a pair of electrodes and measures the moisture content of the green sand stored in the weighing hopper by measuring an electric potential difference between the electrodes; and a kneading control device that controls the amount of water supplied by the water supply device and controls the sand loading means on the basis of the output of the moisture sensor.

12 Claims, 14 Drawing Sheets

(58) Field of Classification Search
USPC .................. 164/5, 155.1, 412, 456; 366/76.2
See application file for complete search history.

(56) References Cited

U.S. PATENT DOCUMENTS 5,330,265 A * 7/1994 Keating, Jr. et al. ........................
B22C 5/0436
366/17
2008/0056060 A1   3/2008  Harada et al.
2015/0114259 A1   4/2015  Ogura et al.

FOREIGN PATENT DOCUMENTS

| JP | S55-113944 A | 9/1980 |
| JP | S61-014044 A | 1/1986 |
| JP | 4003808 B2 | 11/2007 |
| JP | 2013-237086 A | 11/2013 |
| JP | 2015-519200 A | 7/2015 |

OTHER PUBLICATIONS

Jul. 16, 2020 Extended Search Report issued in European Patent Application No. 17898324.3.
Jan. 16, 2018 International Search Report issued in International Patent Application No. PCT/JP2017/041285.

* cited by examiner

[FIG. 2]
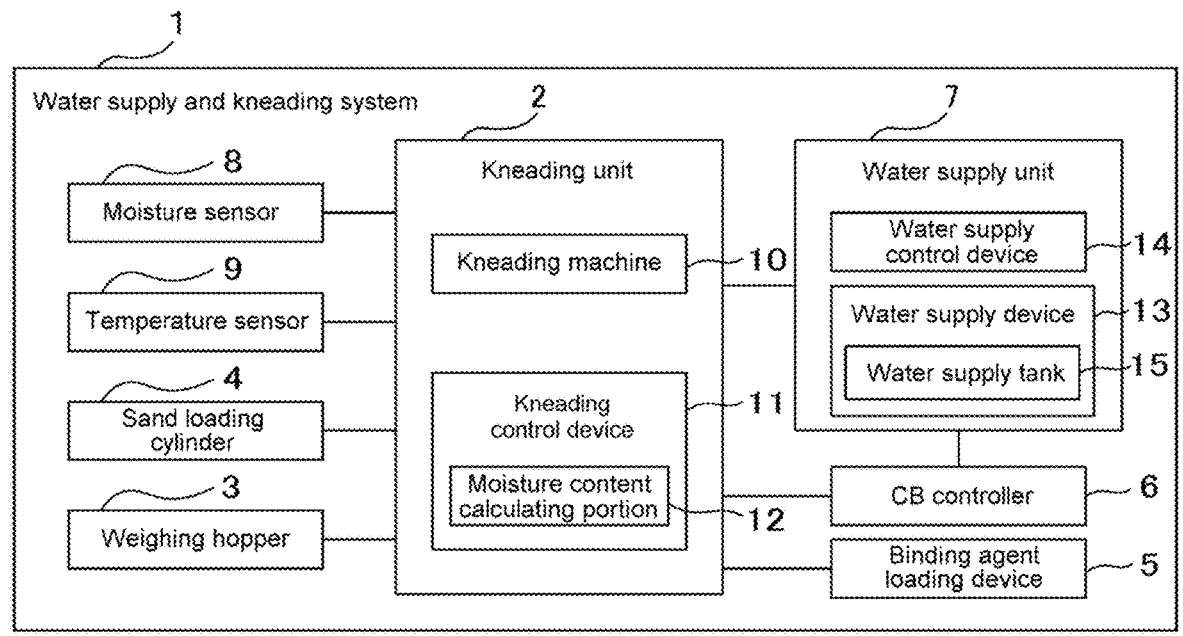
[FIG. 3]
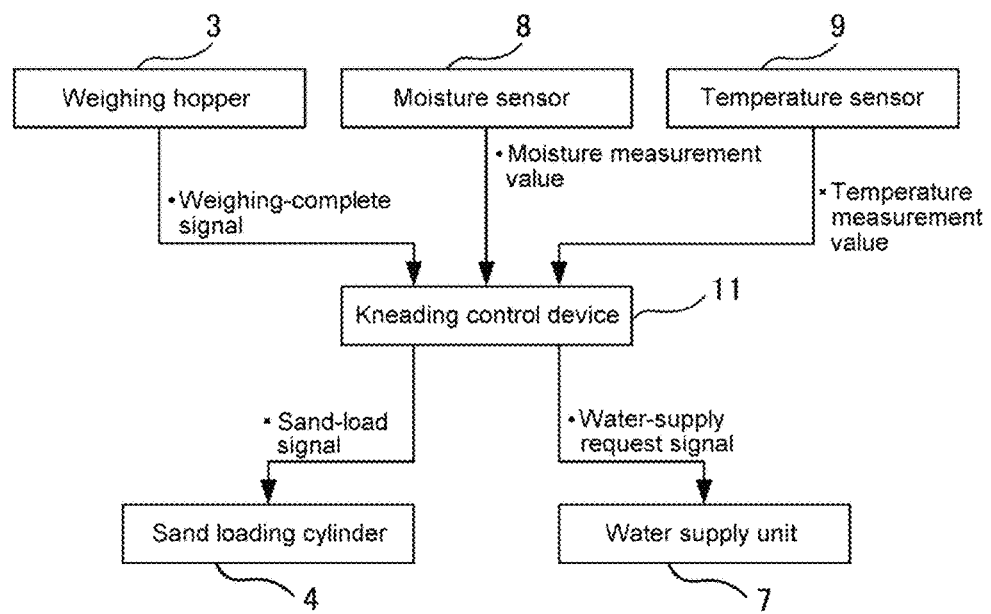

[FIG. 4]
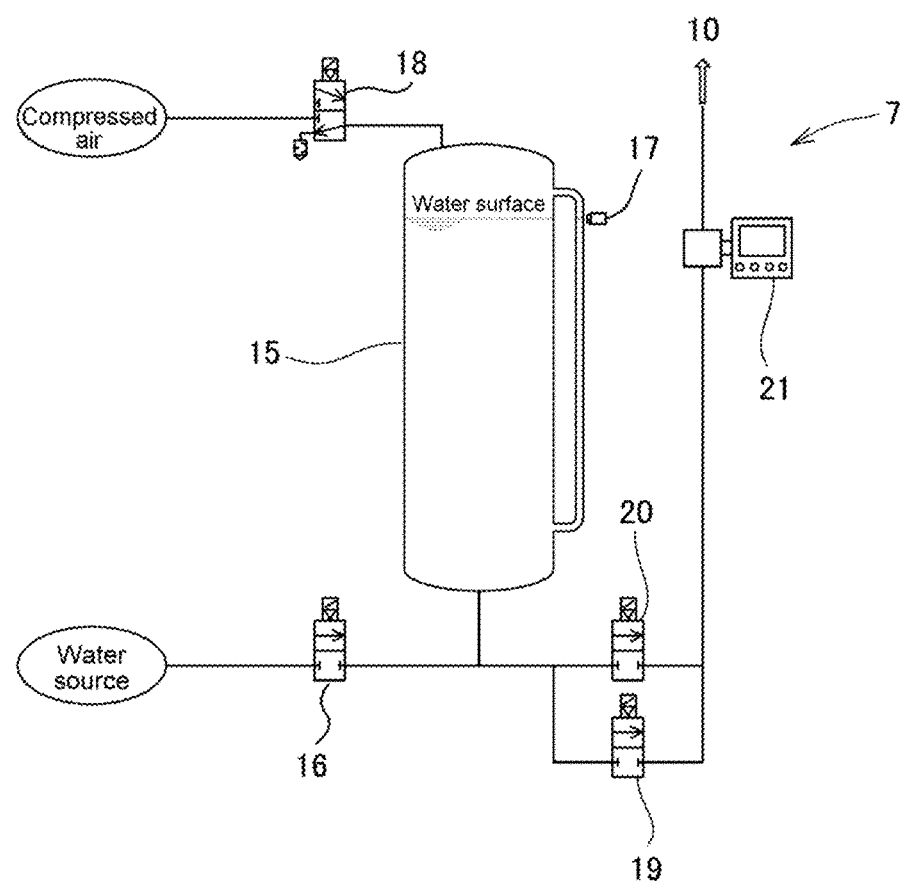

[FIG. 5]
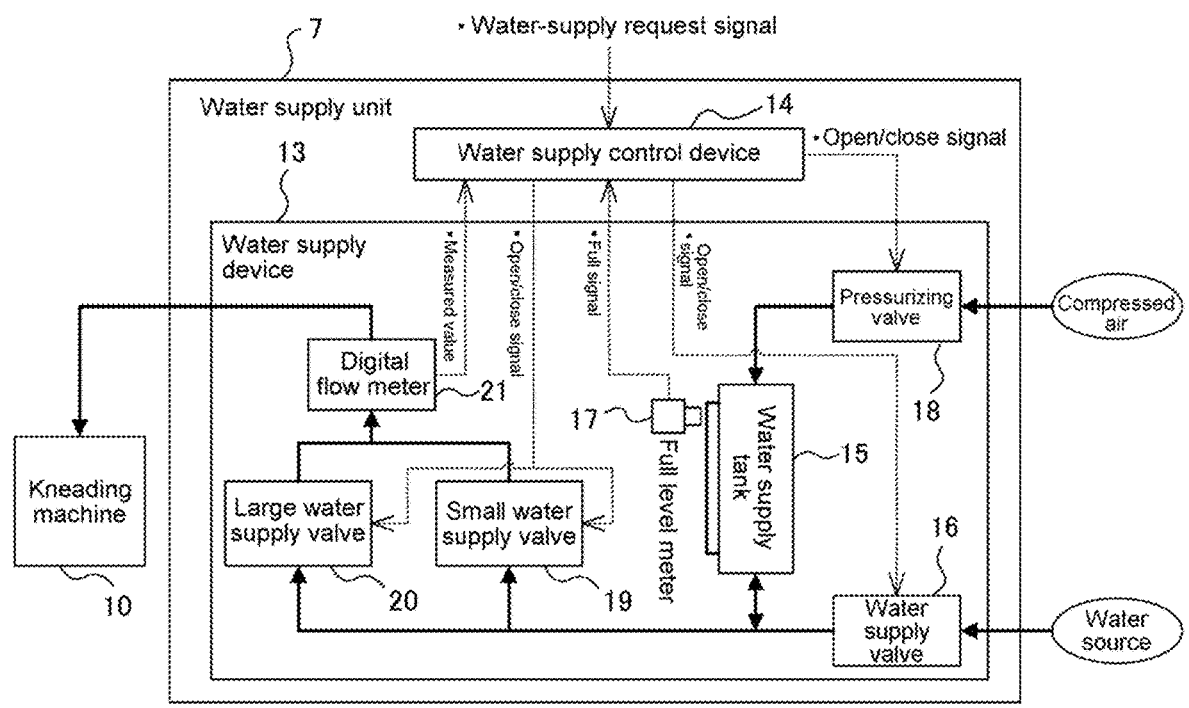

[FIG. 6]
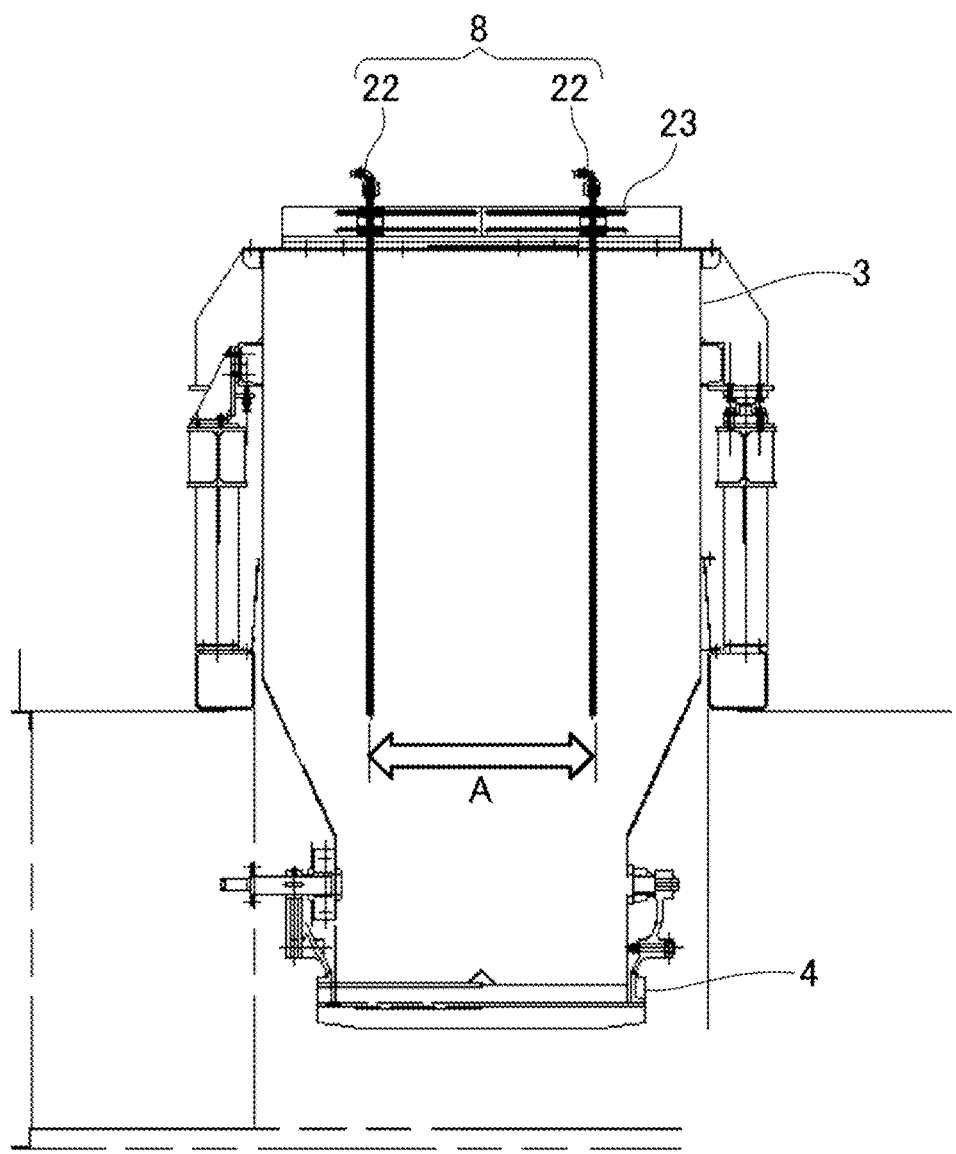

[FIG. 7]
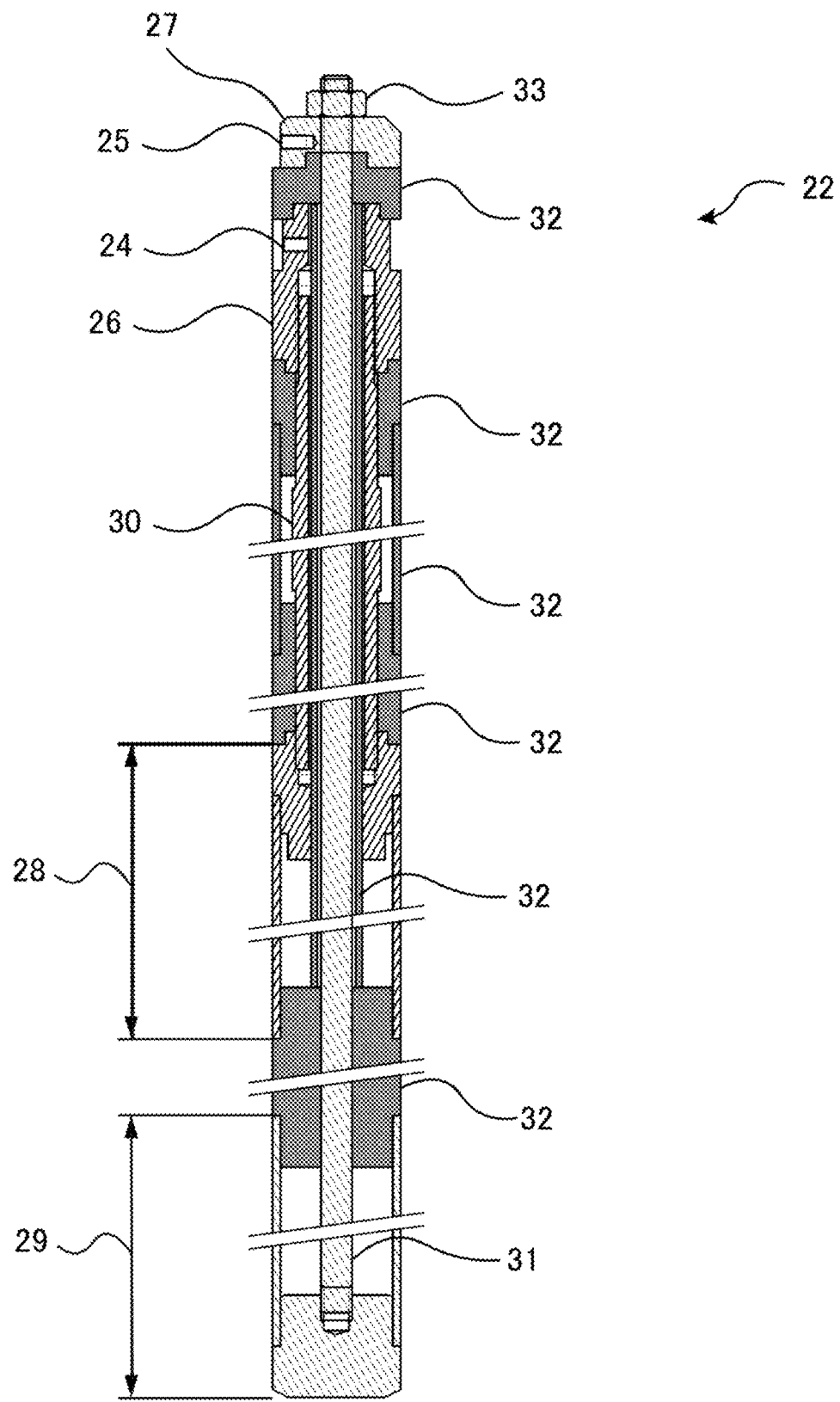

[FIG. 8]
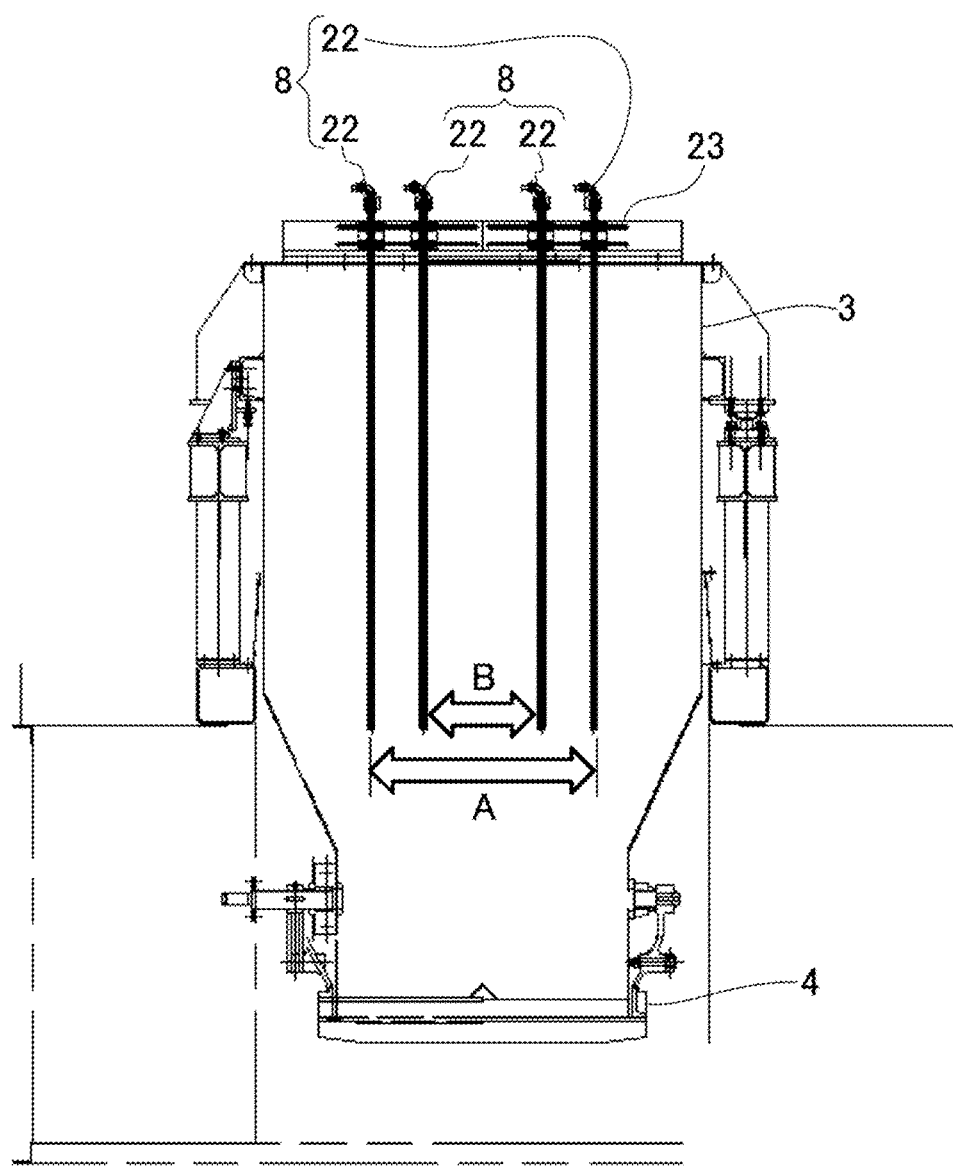

[FIG. 9]
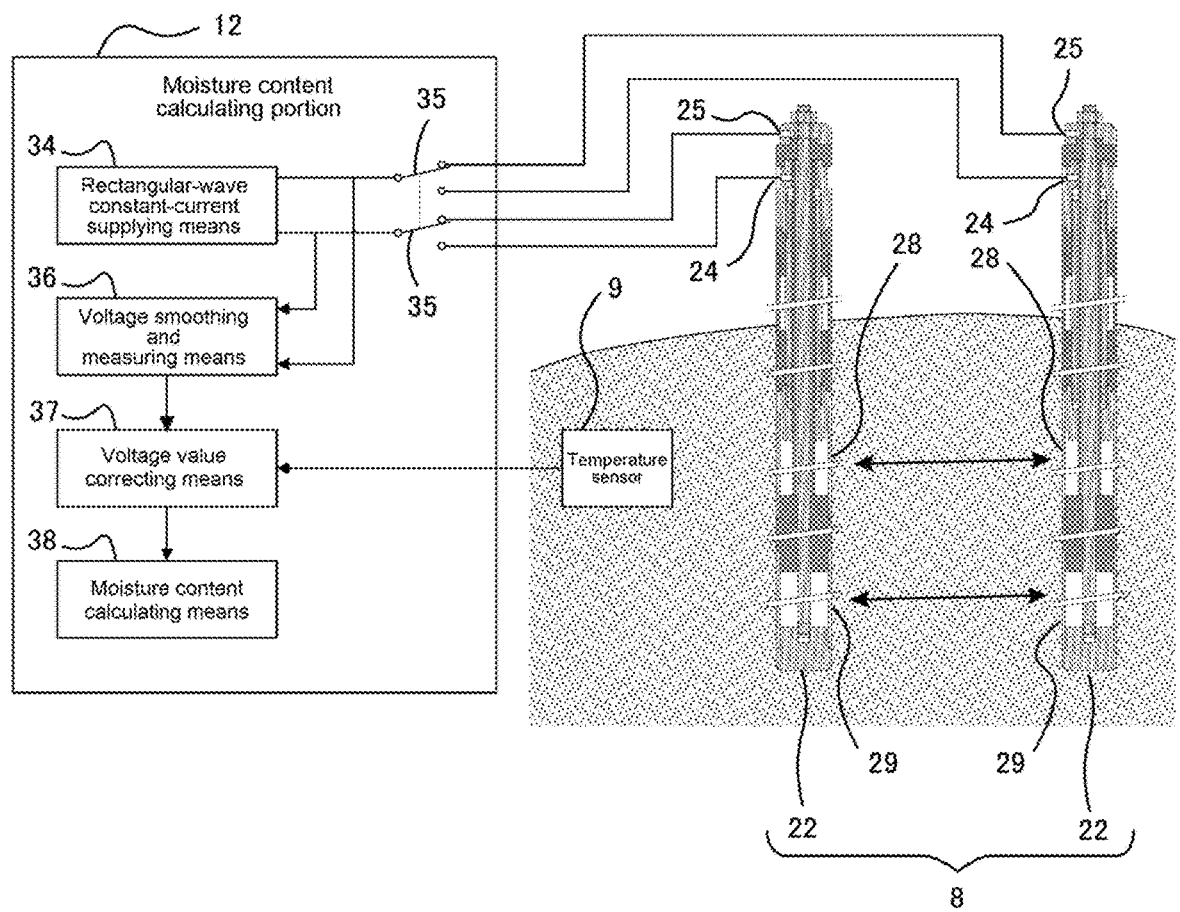

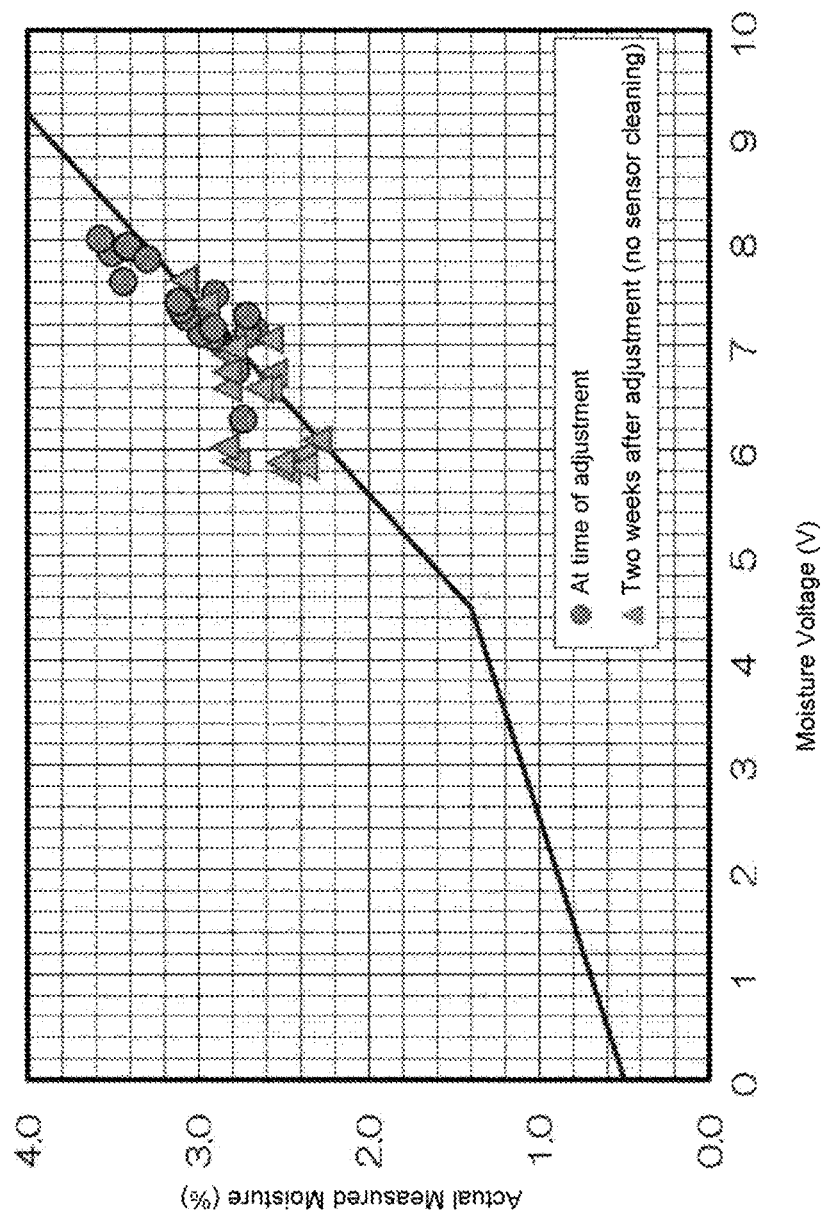
[FIG. 10]

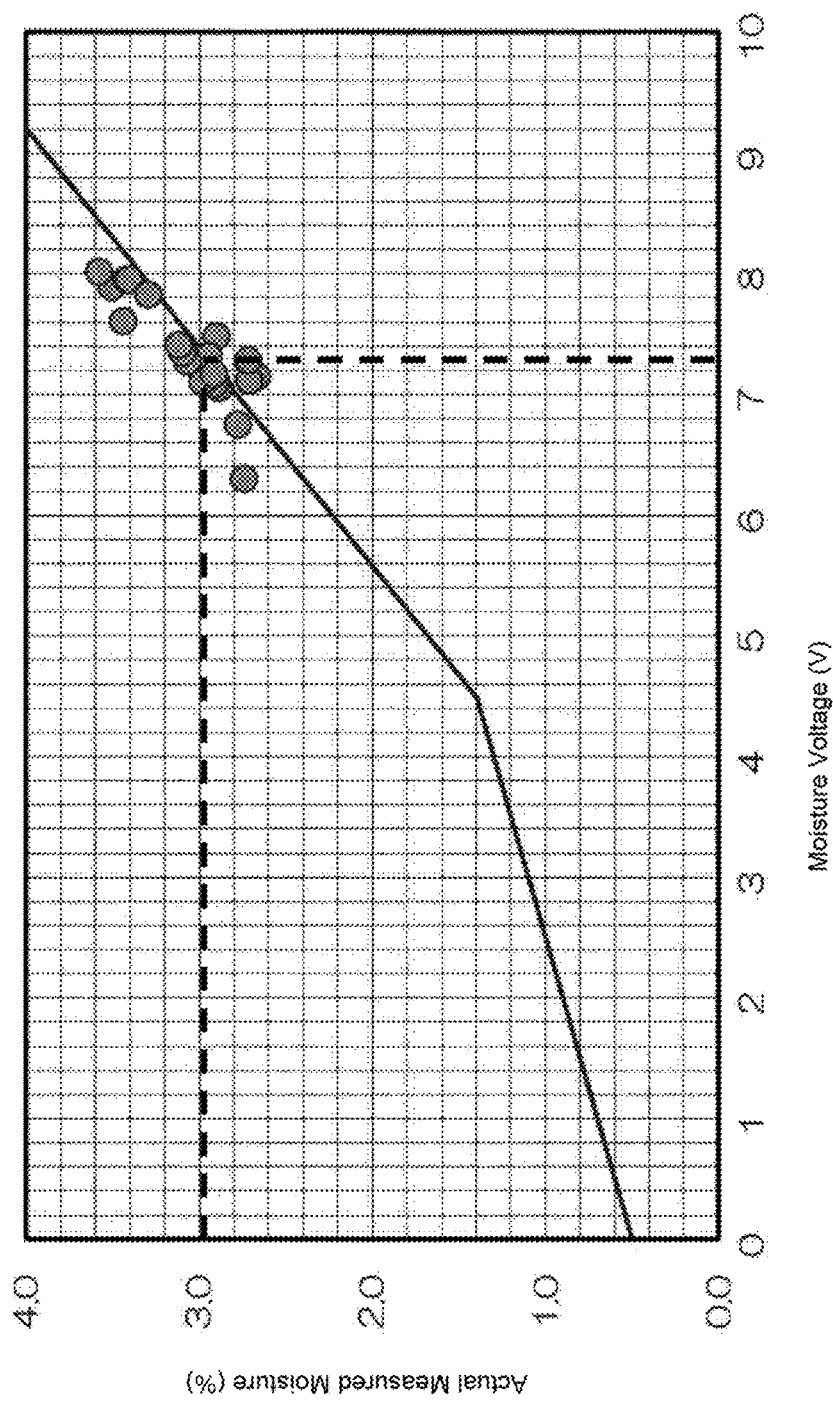
[FIG. 11]

[FIG. 12]
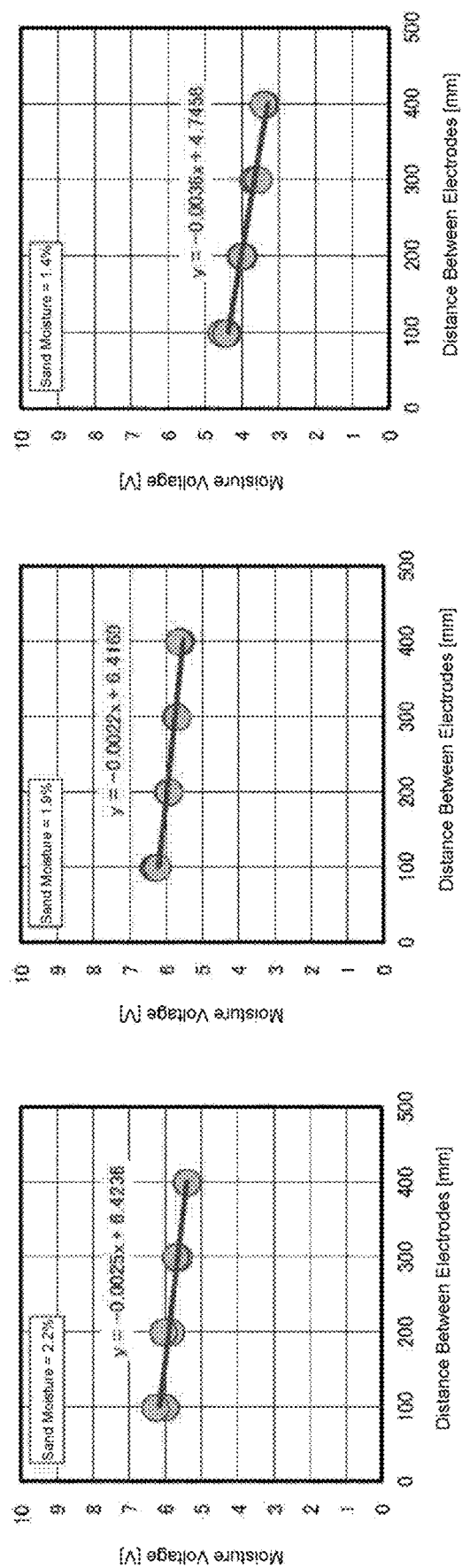

[FIG. 13]
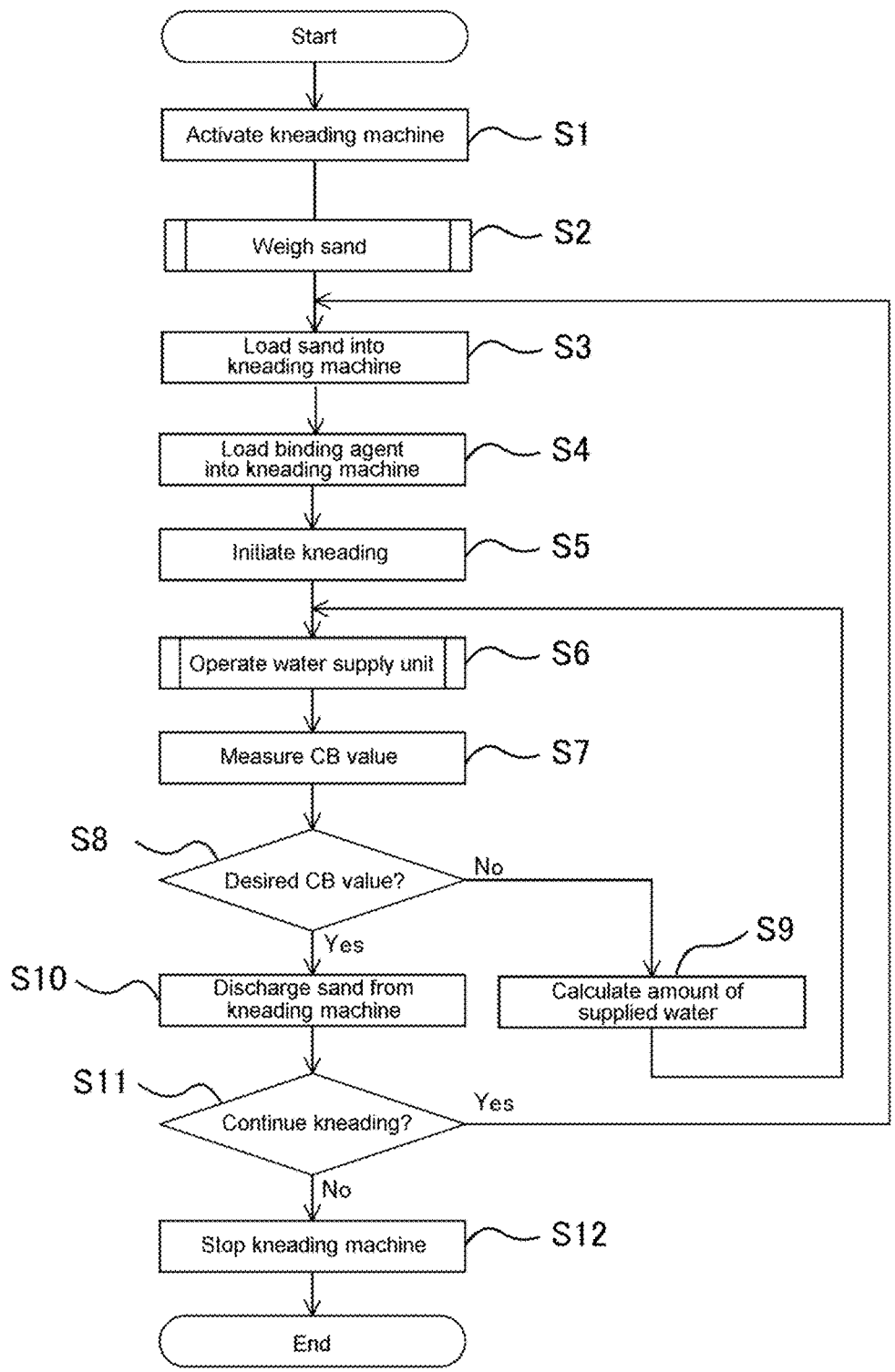

[FIG. 14]
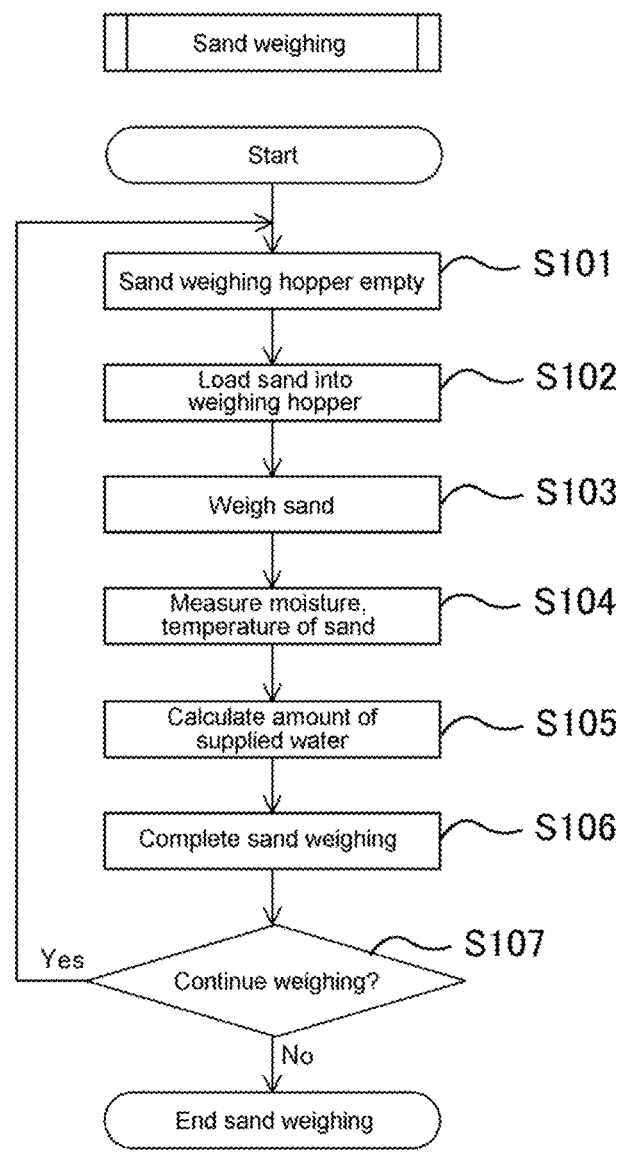

[FIG. 15]
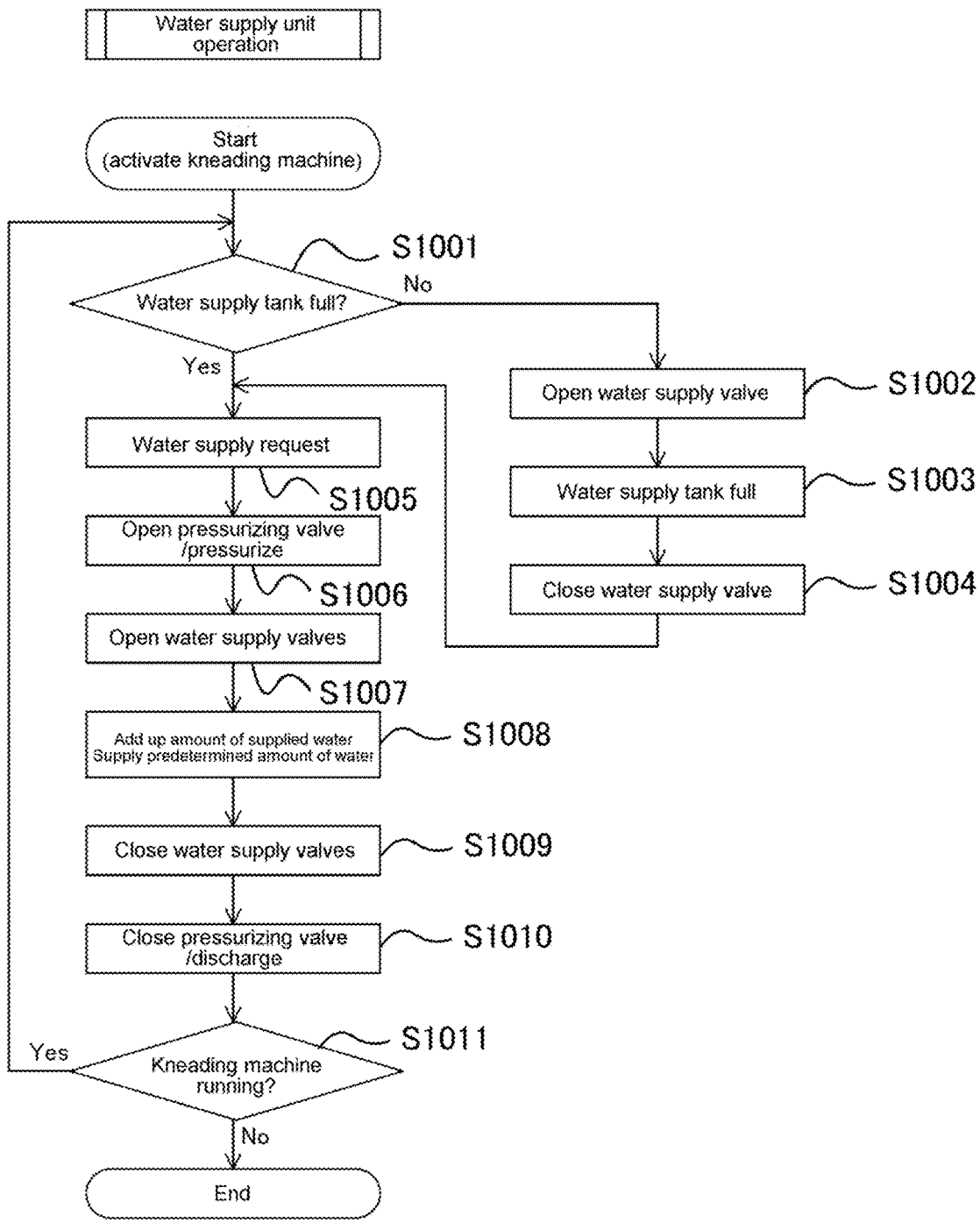

WATER INJECTION AND KNEADING SYSTEM FOR GREEN MOLDING SAND

TECHNICAL FIELD

The present invention pertains to a water supply and kneading system for green sand.

BACKGROUND

Kneading machines that supply water to green sand in which an additive (binding agent) such as bentonite is added to foundry sand and knead the green sand have conventionally been known (for example, see Patent Document 1).

CITATION LIST

Patent Literature

Patent Document 1: JP 2013-237086 A

SUMMARY OF INVENTION

Technical Problem

A water supply and kneading system that produces kneaded sand having more stable properties by more appropriately controlling the amount of water supplied to green sand has long been desired.

The present invention was made in view of the above, and has the purpose of providing a water supply and kneading system that produces kneaded sand having more stable properties by more appropriately controlling the amount of water supplied to green sand.

Solution to Problem

In order to solve the problem described above and achieve the purpose, the water supply and kneading system in the present invention comprises: a weighing hopper that stores green sand that has been weighed; a kneading machine that kneads the green sand and water; a sand loading means for releasing the green sand in the weighing hopper into the kneading machine, or shutting off the release; a water supply device that supplies water to the green sand in the kneading machine; a moisture sensor that comprises a pair of electrodes and measures the moisture content of the green sand stored in the weighing hopper by measuring the electric potential difference between the electrodes; and a kneading control device that controls the amount of water supplied by the water supply device and controls the sand loading means on the basis of an output of the moisture sensor.

Advantageous Effects of Invention

According to the present invention, an effect is achieved in which it is possible to produce kneaded sand having more stable properties by adjusting the ratio of green sand and water and more appropriately controlling the amount of water supplied to green sand.

BRIEF DESCRIPTION OF DRAWINGS

FIG. 2 is a block diagram representing functional components of the water supply and kneading system for green sand.

FIG. 3 is a block diagram representing the relationship between the kneading control device and: the weighing hopper, a sand loading cylinder, a water supply unit, the moisture sensor, and a temperature sensor.

FIG. 4 represents the water supply unit.

FIG. 5 describes a water supply mechanism carried out by the water supply unit.

FIG. 6 is a cross-sectional perspective view along the arrows A-A in FIG. 1.

FIG. 7 represents the details of the electrodes of the moisture sensor.

FIG. 8 shows that it is possible to modify the horizontal distance between the pair of electrodes of the moisture sensor from A to B.

FIG. 9 represents a configuration of the moisture sensor (pair of electrodes) and a moisture content calculating portion.

FIG. 10 is a graph illustrating the relationship between moisture voltage and the actual measured moisture, measured by the moisture sensor immediately after adjustment has ended and after operation for two weeks.

FIG. 11 is a graph illustrating the relationship between moisture voltage and the actual measured moisture measured by the moisture sensor.

FIG. 12 is a graph illustrating the relationship between moisture voltage and the distance between the pair of electrodes.

FIG. 13 is a flow chart illustrating a green sand kneading method using the water supply and kneading system according to the present embodiment.

FIG. 14 is a flow chart illustrating a sand weighing method.

FIG. 15 is a flow chart illustrating a method for operating the water supply unit.

DESCRIPTION OF EMBODIMENTS

Figure 1:
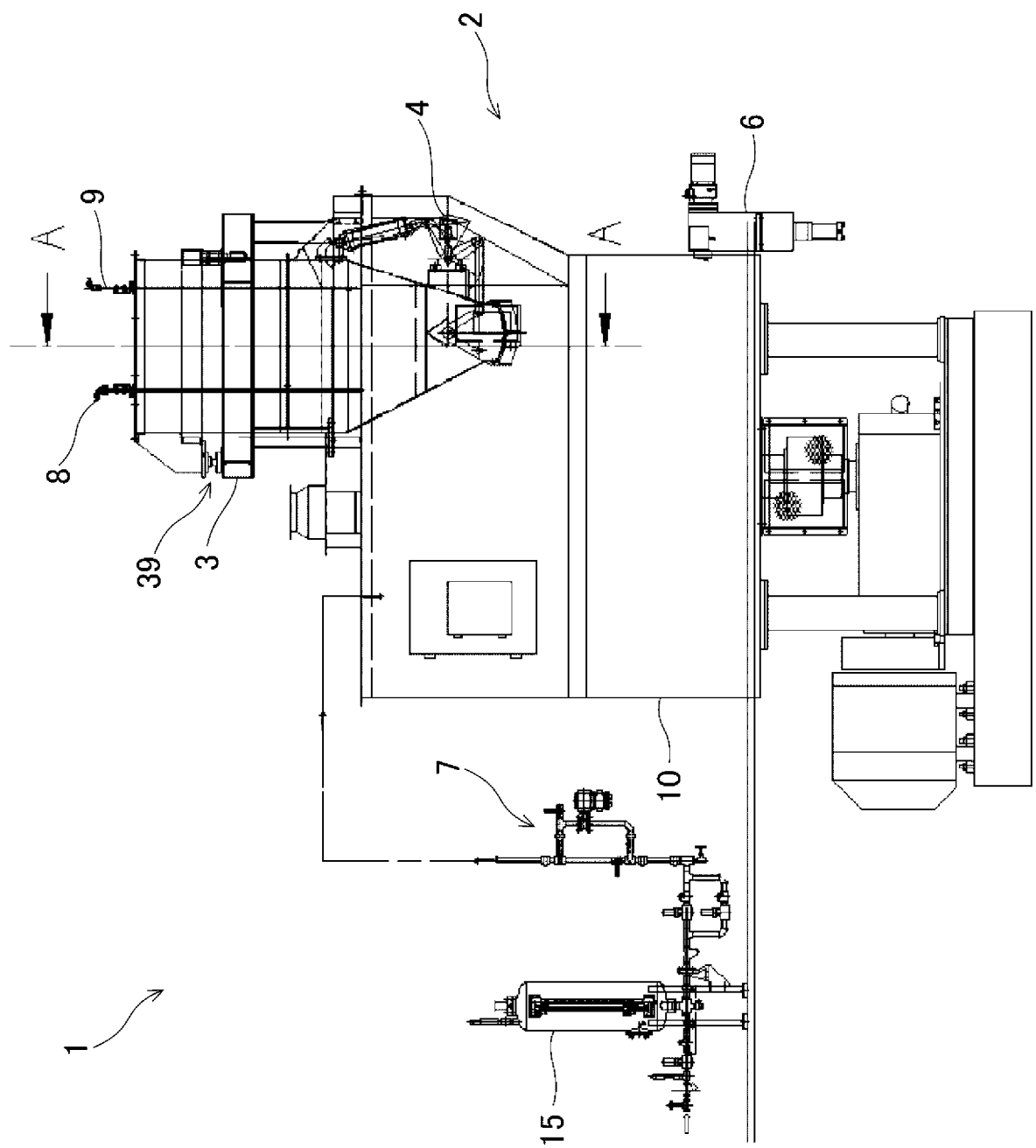
FIG. 1 is a front view of a water supply and kneading system for green sand according to the present embodiment.

Herebelow, embodiments for carrying out the water supply and kneading system for green sand according to the present invention will be described on the basis of drawings, with reference to the attached drawings.

FIG. 1 is a front view of the water supply and kneading system for green sand according to the present embodiment. In addition, FIG. 2 is a block diagram representing functional components of the water supply and kneading system for green sand. A water supply and kneading system 1 adds a binding agent and water to green sand and mixes them to produce kneaded sand having certain properties. The water supply and kneading system 1 comprises: a kneading unit 2; a weighing hopper 3; a sand loading cylinder 4; a binding agent loading device 5; a CB controller 6; a water supply unit 7; a moisture sensor 8; and a temperature sensor 9.

The kneading unit 2 comprises a kneading machine 10 and a kneading control device 11. The kneading machine 10 produces kneaded sand by adding a binding agent released from the binding agent loading device 5 and water supplied from the water supply unit 7 to green sand loaded from the weighing hopper 3, and then mixing them.

The kneading control device 11 controls an opening action of the sand loading cylinder 4, a water supply action of the water supply unit 7, and an action of the kneading machine 10. The kneading control device 11 controls the moisture content of green sand in the kneading machine 10 by determining the amount of water supplied by the water supply unit 7 on the basis of the amount of green sand stored in the weighing hopper 3, a moisture measurement value of the moisture sensor 8 installed in the weighing hopper 3, and a temperature measurement value of the temperature sensor 9 installed in the weighing hopper 3. The kneading control device 11 comprises a moisture content calculating portion 12 that calculates the moisture content of green sand from the measurement value of the moisture sensor 8 and the measurement value of the temperature sensor 9. The moisture content calculating portion 12 will be described in detail later on when the moisture sensor 8 and the temperature sensor 9 are described. The kneading control device 11 sends a sand-load signal and a water-supply request signal.

FIG. 3 is a block diagram representing the relationship between the kneading control device 11 and: the weighing hopper 3; the sand loading cylinder 4; the water supply unit 7; the moisture sensor 8; and the temperature sensor 9. The kneading control device 11 receives a moisture measurement value from the moisture sensor 8, a temperature measurement value from the temperature sensor 9, and a weighing-complete signal from the weighing hopper 3. In addition, the kneading control device 11 transmits, to the sand loading cylinder 4, a sand-load signal instructing the sand loading cylinder 4 to open and load green sand into the kneading machine 10. The kneading control device 11 also transmits, to the water supply unit 7, a water-supply request signal providing instructions regarding supply of water and the amount of supplied water. The kneading control device 11 is for example a computer or a PLC that is electrically connected to the weighing hopper 3, the sand loading cylinder 4, the water supply unit 7, the moisture sensor 8, and the temperature sensor 9.

The weighing hopper 3 weighs green sand using a sand weighing means (not shown) provided to the weighing hopper 3, and stores this sand. Then, after the weighing of green sand is completed, the weighing hopper 3 sends a weighing-complete signal to the kneading control device 11. The weighing of green sand in the present embodiment is performed using the weighing hopper 3, but note that it is possible to provide a separate device that weighs sand and use the present weighing hopper 3 only to store green sand that has been weighed. The weighing hopper 3 is disposed on top of the kneading machine 10. The sand weighing means operates by receiving an activation signal of the kneading machine 10, but note that the means can operate by other ways such as a manual signal from an operator.

The sand loading cylinder 4 opens a space between the weighing hopper 3 and the kneading machine 10 on the basis of the instruction from the kneading control device 11, and closes the space between the weighing hopper 3 and the kneading machine 10 by means of timer control after a certain period of time has passed. Specifically, green sand in the weighing hopper 3 is released into the kneading machine 10 by opening the sand loading cylinder 4, and closing the sand loading cylinder 4 after green sand is loaded into the kneading machine 10 prevents the flowing of green sand from the weighing hopper 3 into the kneading machine 10 when green sand is newly weighed in the weighing hopper 3 for the next kneaded batch. The sand loading cylinder 4 is installed between the weighing hopper 3 and the kneading machine 10.

The binding agent loading device 5 releases a binding agent into the kneading machine 10 in accordance with an instruction from the kneading control device 11 or an instruction from an operator. The binding agent loading device 5 (not shown) is disposed on top of the kneading machine 10. Note that in the present embodiment, bentonite is used as a binding agent.

The CB controller 6 measures the CB value (compactability value), which is a property of sand that has been kneaded, and determines whether or not the sand that has been kneaded has a desired CB value. If the kneaded sand does not have a desired CB value, the CB controller 6 instructs additional water to be supplied. The CB controller 6 has a computer or a PLC.

Water Supply Unit

The water supply unit 7 supplies water into the kneading machine 10 and adds an optimal amount of supplied water to the green sand and binding agent in the kneading unit 2. FIG. 4 represents the water supply unit 7. In addition, FIG. 5 describes the water supply mechanism carried out by the water supply unit 7. The water supply unit 7 comprises a water supply device 13 and a water supply control device 14.

The water supply device 13 supplies water from a water source to the kneading machine 10. The water supply device 13 comprises: a water supply tank 15; a water supply valve 16; a full level meter 17; a pressurizing valve 18; a small water supply valve 19; a large water supply valve 20; and a digital flow meter 21.

The water supply tank 15 stores water from a water source, such as a water pipe. The water supply valve 16 adjusts the amount of water supplied to the water supply tank 15 by opening and closing a valve. The water supply valve 16 is provided between the water source and the water supply tank 15. The full level meter 17 measures whether the amount of water in the water supply tank 15 is at full. The full level meter 17 is provided in the water supply tank 15 at a position at the same height as the water surface when water in the water supply tank 15 is at full. The pressurizing valve 18 adjusts the amount of compressed air that pressurizes the inside of the water supply tank 15 by opening and closing a valve. The pressurizing valve 18 is provided between a compressed air source and the water supply tank 15.

The small water supply valve 19 and the large water supply valve 20 adjust the amount of water flowing from the water supply tank 15 to the kneading machine 10 by opening and closing valves. The small water supply valve 19 and the large water supply valve 20 are connected in parallel between the water supply tank 15 and the kneading machine 10. The digital flow meter 21 measures the flow rate of water released from the water supply tank 15. The digital flow meter 21 is disposed at a position downstream from the small water supply valve 19 and the large water supply valve 20. The water in the water supply tank 15 is supplied to the kneading machine 10 through the small water supply valve 19, the large water supply valve 20, and the digital flow meter 21.

Here, when the valves are open, the amount of water flowing to the small water supply valve 19 is set so as to be less than the amount of water flowing to the large water supply valve 20. For example, the ratio of the flow rate of the amount of water flowing to the small water supply valve 19 and the amount of water flowing to the large water supply valve 20 is set from 1:2 to 1:10.

The water supply control device 14 controls the water supply device 13 and supplies water to the water supply tank 15. In addition, the water supply control device 14 controls the water supply device 13 on the basis of a water-supply request signal from the kneading control device 11 and adjusts the amount of water supplied from the water supply tank 15 to the kneading machine 10. Specifically, water is supplied to the water supply tank 15 by controlling the opening and closing of the water supply valve 16, and the amount of water supplied to the kneading machine 10 is adjusted by controlling the opening and closing of the pressurizing valve 18, the small water supply valve 19, and the large water supply valve 20.

Next, the mechanism by which the water supply unit 7 supplies water from a water source to the water supply tank 15 will be described. First, once the kneading machine 10 is activated, the water supply control device 14 measures whether the amount of water in the water supply tank 15 is at full by using the full level meter 17. Then, if the amount of the water in the water supply tank 15 is not at full, the water supply control device 14 instructs the water supply valve 16 to open. Consequently, the water supply valve 16 is opened and supply of water to the water supply tank 15 is initiated. Once the amount of water in the water supply tank 15 is at full, the water supply control device 14 instructs the water supply valve 16 to close. Consequently, the water supply valve 16 is closed, and the supply of water to the water supply tank 15 ends. Note that if the amount of water in the water supply tank 15 is at full at the time of activation of the kneading machine 10, the water supply control device 14 does not issue any particular instructions.

Furthermore, the water supply control device 14 monitors whether the amount of water in the water supply tank 15 is at full using the full level meter 17, even after the water supply unit 7 has supplied water from the water supply tank 15 to the kneading machine 10. During activation of the kneading machine 10, the water supply control device 14 continually controls the amount of water in the water supply tank 15 such that the amount of water in the water supply tank 15 is at full, except when water is supplied to the kneading machine 10.

Next, the mechanism by which the water supply unit 7 supplies water from the water supply tank 15 to the kneading machine 10 will be described. First, once the water supply control device 14 receives a water-supply request signal from the kneading control device 11, the water supply control device 14 instructs the pressurizing valve 18 to open. Consequently, compressed air is supplied to the water supply tank 15 and the inside of the water supply tank 15 is pressurized. Next, the water supply control device 14 instructs the small water supply valve 19 and the large water supply valve 20 to open. Consequently, the small water supply valve 19 and the large water supply valve 20 are opened, and supply of water to the kneading machine 10 is initiated. The digital flow meter 21 adds up the amount of supplied water, and when this value reaches the amount of supplied water that was set based on the originally-determined amount of supplied water required, the large water supply valve 20 through which a high flow rate is flowing is closed, and the supply of water is continued using only the small water supply valve 19 through which a low flow rate is flowing.

The amount of water, from when the water supply control device 14 sends a close signal to the small water supply valve 19 until the supply of water by the small water supply valve 19 stops, is ascertained beforehand. When the amount of supplied water that was added up reaches an amount obtained by subtracting, from the target amount of water, the amount of water accumulated up until this supply of water stops, the water supply control device 14 sends the close signal for the small water supply valve 19. Note that the amount of water accumulated up until the supply of water stops does not always need to be ascertained via measurement, and may be regulated using measured values of the digital flow meter 21 when the supply of water is completed with respect to the target amount of water. These steps enable accurate supply of water, even if a pipe become clogged or there is a water pressure change in the water supply device 13. After the supply of water is completed, the water supply control device 14 instructs the pressurizing valve 18 to close. Consequently, compressed air is discharged from the water supply tank 15, and the pressure inside the water supply tank 15 returns to the pre-pressurization state.

Note that in the present embodiment, the digital flow meter 21 is disposed downstream of the small water supply valve 19 and the large water supply valve 20, but may also be disposed on a path from the small water supply valve 19 and the large water supply valve 20 to the water supply tank 15. In other words, water may flow to the small water supply valve 19 and the large water supply valve 20 after the digital flow meter 21 has measured the flow rate of water released from the water supply tank 15.

Moisture Sensor and Temperature Sensor

FIG. 6 is a cross-sectional perspective view along the arrows A-A in FIG. 1. In addition, FIG. 7 represents the details of the electrodes of the moisture sensor 8. The moisture sensor 8 measures the moisture content of sand loaded into the weighing hopper 3. The moisture sensor 8 comprises a pair of rod-like electrodes 22 and measures the moisture between the pair of electrodes.

The moisture sensor 8 (pair of electrodes 22) is attached in the weighing hopper 3 via an insulator to a moisture sensor support device 23 provided on top of the weighing hopper 3. Slots are cut in the moisture sensor support device 23, enabling lateral movement, and because the moisture sensor 8 itself is held by a pipe clamp, movement in the up-down direction is also possible. Thus, the moisture sensor support device 23 is configured such that it is possible to freely adjust the height of installation of the moisture sensor 8 (pair of electrodes 22) relative to the weighing hopper 3 and the horizontal distance between the moisture sensors 8 (pair of electrodes 22). Specifically, the pair of electrodes are configured so as to be able to be spaced apart and in close proximity in a horizontal direction, and raised and lowered in an up-down direction, using the moisture sensor support device 23.

In this manner, the moisture measurement range can be increased by adjusting the distance between the pair of electrodes 22. Turning to FIG. 6, the pair of electrodes 22 are installed facing downward from above the weighing hopper 3 while spaced apart by distance A, and the upper ends of the pair of electrodes 22 are exposed from the upper surface of the weighing hopper 3. FIG. 8 shows that it is possible to modify the horizontal distance between the pair of electrodes 22 of the moisture sensor 8 from A to B.

In the present embodiment, the electrodes 22 measure moisture content at two locations, which are an upper part and a bottom part. The electrodes 22 comprise: an upper electrode wiring connection 24; a lower electrode wiring connection 25; an upper electrode wiring connection member 26; a lower electrode wiring connection member 27; an upper electrode section 28; a lower electrode section 29; an upper electrode conductive member 30; a lower electrode conductive member (shaft component) 31; an insulating member 32; and a nut 33.

The upper electrode wiring connection 24 electrically connects the upper electrode wiring connection member 26 and the kneading control device 11 (moisture content calculating portion 12) via an electric wire, etc. The lower electrode wiring connection 25 electrically connects the lower electrode wiring connection member 27 and the kneading control device 11 (moisture content calculating portion 12) via an electric wire, etc.

The upper electrode section 28 is in electrical contact with the green sand at an upper-layer portion of the weighing hopper 3, and is used for the measurement of the value of electric current flowing between the opposing pair of electrodes 22. The lower electrode section 29 is in electrical contact with the green sand at a lower-layer portion of the weighing hopper 3, and is used for the measurement of the value of electric current flowing between the opposing pair of electrodes 22.

The upper electrode conductive member 30 electrically connects the upper electrode wiring connection member 26 and the upper electrode section 28. The lower electrode conductive member (shaft component) 31 is disposed at the center of the electrodes 22, and electrically connects the lower electrode wiring connection member 27 and the lower electrode section 29. The lower electrode conductive member (shaft component) 31 is also a portion that serves as an axis of the electrodes 22.

The insulating member 32 electrically insulates: the structural members needed to measure moisture content at the upper part, these members comprising the upper electrode wiring connection 24, the upper electrode wiring connection member 26, the upper electrode section 28, and the upper electrode conductive member 30; and the structural members needed to measure moisture content at the lower part, these members comprising the lower electrode wiring connection 25, the lower electrode wiring connection member 27, the lower electrode section 29, and the lower electrode conductive member (shaft component) 31.

Specifically, the insulating member 32 with a substantially tubular body is disposed around the lower electrode conductive member (shaft component) 31, which is at the center of the electrodes 22. Furthermore, the upper electrode conductive member 30 with a substantially tubular body is disposed around the insulating member 32. Accordingly, the upper electrode section 28 and the lower electrode section 29 form separate upper and lower measurement sections with the insulating member 32 serving as a border.

Note that the tip portion, comprising the upper electrode section 28 and the lower electrode section 29 and the insulating member 32 disposed therebetween, is one integrated portion.

The nut 33 secures each of the structural components of the electrodes 22. In addition, the electrodes 22 are structured such that the tip portion mentioned above can easily be removed by loosening the nut 33. For this reason, even if the tip portion wears due to contact with green sand, it is possible to replace only this portion with a new component. Once the nut 33 is tightened, the structural components are secured; the lower electrode wiring connection member 27 and the lower electrode section 29 are electrically connected through the lower electrode conductive member 31; and the upper electrode wiring connection member 26 and the upper electrode section 28 are electrically connected through the upper electrode conductive member 30.

The temperature sensor 9 measures the temperature of green sand loaded into the weighing hopper 3, as shown in FIG. 1. The temperature sensor 9 is attached to a temperature sensor support device (not shown) provided on top of the weighing hopper 3 and is installed in the weighing hopper 3. Slots are cut in the temperature sensor support device, enabling lateral movement, and because the temperature sensor 9 itself is held by a pipe clamp, movement in the up-down direction is also possible. Thus, the temperature sensor 9 is configured so as to be freely adjustable relative to the position where the moisture sensor 8 is installed. Normally, measurement sections of the temperature sensor 9 are adjusted so as to be at positions corresponding to the upper electrode section 28 and the lower electrode section 29 of the moisture sensor 8 (pair of electrodes 22).

Next, the moisture content calculating portion 12 that calculates the moisture content of green sand by controlling the moisture sensor 8 (pair of electrodes 22) will be described. FIG. 9 represents a configuration of the moisture sensor 8 (pair of electrodes 22) and the moisture content calculating portion 12. The pair of electrodes 22 are electrically connected to the moisture content calculating portion 12. The moisture content calculating portion 12 comprises: a rectangular-wave constant-current supplying means 34; a switch 35; a voltage smoothing and measuring means 36; a voltage value correcting means 37; and a moisture content calculating means 38.

The rectangular-wave constant-current supplying means 34 supplies a constant current having a rectangular wave and a low frequency to the upper electrode section 28 and the lower electrode section 29 of each of the pair of electrodes 22 via the upper electrode wiring connection 24 and the lower electrode wiring connection 25. The switch 35 switches between supplying to the upper electrode section 28 or the lower electrode section 29, the constant current having a rectangular wave and a low frequency, which is supplied from the rectangular-wave constant-current supplying means 34 to the two electrodes 22. Thus, the supply timing of the constant current having a rectangular wave and a low frequency supplied between the opposing upper electrode sections 28, and the constant current having a rectangular wave and a low frequency supplied between the opposing lower electrode sections 29, is staggered by switching. Consequently, constant current is not simultaneously supplied to the upper electrode section 28 and the lower electrode section 29.

The voltage smoothing and measuring means 36 smooths and measures the voltage generated between the upper electrode wiring connections 24 of the pair of electrodes 22 by the current flowing between the upper electrode sections 28 of the pair of electrodes 22 via the green sand. Similarly, the voltage smoothing and measuring means 36 smooths and measures the voltage generated between the lower electrode wiring connections 25 of the pair of electrodes 22 by the current flowing between the lower electrode sections 29 of the pair of electrodes 22 via the green sand.

The voltage value correcting means 37 corrects the smoothed voltage value obtained from the voltage smoothing and measuring means 36 on the basis of the temperature measurement result from the temperature sensor 9. The moisture content calculating means 38 calculates the moisture content of green sand on the basis of the smoothed voltage value that was corrected by the voltage value correcting means 37.

After the moisture sensor 8 (pair of electrodes 22) is disposed in the green sand of which the moisture content is to be measured, a current is caused to flow between the upper electrode sections 28 of the pair of electrodes 22 and between the lower electrode sections 29 of the pair of electrodes 22 via the green sand by supplying a constant current having a rectangular wave and a low frequency to the upper electrode section 28 and the lower electrode section 29 of the pair of electrodes 22 by means of the rectangular-wave constant-current supplying means 34. Then, the voltage generated between the two upper electrode wiring connections 24 and the voltage generated between the two lower electrode wiring connections 25 are smoothed and measured by the voltage smoothing and measuring means 36.

Next, based on the measurement result of the temperature sensor 9, the voltage value correcting means 37 corrects the smoothed voltage value obtained from the voltage smoothing and measuring means 36, and based on this smoothed voltage value, the moisture content calculating means 38 calculates the moisture content of the green sand. This allows the actual moisture content of the green sand to be calculated. Note that measurement by the upper electrode section 28 of the electrodes 22 and measurement by the lower electrode section 29 of the electrodes 22 are alternately performed.

If using a large-capacity hopper, measurement accuracy can be improved by respectively measuring the upper and lower layers of the green sand layer with the upper electrode section 28 and the lower electrode section 29 and averaging values. On the other hand, when using a small-capacity hopper, the measurement accuracy required can be achieved by using only either the upper electrode section 28 or the lower electrode section 29.

Conventionally, a parallel-plate electrode-type moisture sensor was installed on a belt conveyor before green sand was stored in the weighing hopper 3, and the moisture content of the green sand flowing along the belt conveyor was measured. However there were problems in that it was not possible to measure moisture content under the same conditions unless the moisture sensor was buried to a certain depth in the green sand layer, necessitating a fixed-amount cut-out hopper that cuts out a fixed amount of green sand, and furthermore, depending on the layout, it was not possible to measure moisture just before kneading. In addition, there was the problem of unstable measurement accuracy because measurements were being taken for green sand flowing on the belt conveyor.

On the other hand, because the moisture sensor 8 according to the present embodiment is a pair of rod-like electrodes 22, the moisture sensor 8 has advantages as described below, in addition to those described above.

- Easy to incorporate into existing equipment without the need for a belt conveyor or a fixed-amount hopper when installing.
- Enables measurement of moisture content just before green sand loading.
- Sensor itself has reduced green sand friction and is less susceptible to wear in comparison to a parallel-plate electrode-type moisture sensor, which is installed on a belt conveyor and measures green sand flowing along the belt conveyor.
- Stable measurement accuracy because the moisture content of green sand that has been stored is measured.
- Easy to incorporate with little modification when making additional modification to existing equipment, because the moisture sensor 8 (and the temperature sensor 9) can easily be attached by attaching the moisture sensor support device 23 (and the temperature sensor support device) to the weighing hopper 3.
- Because the moisture sensor 8 (and the temperature sensor 9) can be installed in the weighing hopper 3, a particular location is not needed for installation of the moisture sensor 8 (and the temperature sensor 9).
- Because the moisture sensor 8 (and the temperature sensor 9) is exposed from the weighing hopper 3, the distance between the moisture sensors 8 and the insertion depth of the moisture sensor 8 (and the temperature sensor 9) can be modified from outside.

EXAMPLES

The water supply and kneading system 1 of the present embodiment was actually operated and the measurement accuracy of the moisture sensor 8 was evaluated.

Experiment 1: The moisture content of green sand measured by the moisture sensor 8 just after adjustment has ended, and the moisture content of green sand measured by the moisture sensor 8 after the water supply and kneading system 1 was operated for two weeks, after the end of adjustment, were measured. Note that the moisture sensor 8 was never cleaned while the water supply and kneading system 1 was being operated. FIG. 10 is a graph illustrating the relationship between moisture voltage and the actual measured moisture, measured by the moisture sensor 8 immediately after adjustment has ended and after operation for two weeks. In the case of conventional sensors, green sand would adhere to the measurement section thereof and result in unstable measurement just by operating the water supply and kneading system 1 for one day. On the other hand, the measurement accuracy of the moisture sensor 8 of the present embodiment did not decrease, even after the water supply and kneading system 1 was operated and two weeks had passed.

Experiment 2: The range of moisture content of green sand that the moisture sensor 8 can measure was checked. FIG. 11 is a graph illustrating the relationship between moisture voltage and the actual measured moisture measured by the moisture sensor 8. Conventional sensors were incapable of performing measurements of high moisture limits of green sand moisture content of around 3%. On the other hand, the moisture sensor 8 of the present embodiment was able to perform measurements even when the moisture content of the green sand was around 3%.

Experiment 3: Green sand was caused to have a certain moisture content, the distance between the pair of electrodes 22 was increased, and the moisture voltage at that time was measured. Measurements were performed when the moisture content of the green sand was 2.2%, 1.9%, and 1.4%, respectively. FIG. 12 is a graph illustrating the relationship between moisture voltage and the distance between the pair of electrodes 22. Regarding the moisture sensor 8 of the present embodiment, the moisture voltage decreased when the distance between the electrodes 22 was increased, even when green sand having the same moisture content was measured. Thus, the measurement range can be increased by increasing the distance between the electrodes 22, even if the moisture content of the green sand to be measured is high.

Water Supply and Kneading Method

Next, a green sand kneading method using the water supply and kneading system 1 according to the present embodiment will be described. FIG. 13 is a flow chart illustrating a green sand kneading method using the water supply and kneading system 1 according to the present embodiment.

First, the kneading machine 10 is activated (step S1). Sand weighing for weighing the green sand to be loaded into the kneading machine 10 is initiated simultaneously with the activation of the kneading machine 10 (step S2). Next, the sand weighing is completed, and a sand-load signal is transmitted from the kneading control device 11 to the sand loading cylinder 4. Once the sand loading cylinder 4 receives the sand-load signal, the sand loading cylinder 4 opens and the green sand is loaded from the weighing hopper 3 into the kneading machine 10 (step S3). The sand loading cylinder 4 closes the space between the weighing hopper 3 and the kneading machine 10 after a certain period of time has passed by means of timer control.

Next, in accordance with an instruction from the kneading control device 11, a binding agent is loaded from the binding agent loading device 5 into the kneading machine 10 (step S4). Next, the kneading control device 11 instructs the kneading machine 10 and kneading by the kneading machine 10 is initiated (step S5).

Next, the kneading control device 11 transmits a water-supply request signal to the water supply control device 14 of the water supply unit 7. Once the water supply control device 14 of the water supply unit 7 receives the water-supply request signal, the water supply control device 14 initiates the water supply operation (step S6). Then, water is supplied from the water supply tank 15 of the water supply unit 7 to the kneading machine 10. Note that the water supply operation by the water supply unit 7 will be described in detail later on.

Next, the CB controller 6 measures the CB value (step S7), and determines whether or not the kneaded sand has a desired CB value (step S8). If the CB controller 6 determines that the kneaded sand does not have the desired CB value (step S8: No), the CB controller 6 calculates the amount of supplied water needed (step S9), and instructs the water supply unit 7 through the kneading control device 11 so as to supply the calculated amount of water to the kneading machine 10 again (transmit water-supply request signal). Then, returning to step S6, the water supply control device 14 of the water supply unit 7 initiates the water supply operation again.

If the CB controller 6 determines that the kneaded sand has the desired CB value (step S8: Yes), the kneaded sand is discharged from the kneading machine 10 (step S10).

Next, the kneading control device 11 determines whether or not the kneading operation will be performed continuously from the amount of green sand scheduled to be kneaded (step S11). If the kneading control device 11 determines that the kneading operation will be performed continuously (step S11: Yes), then the method returns to step S3, waits for the sand weighing to be completed (step S2), and repeats step S3 and the subsequent steps. In addition, if the kneading control device 11 determines that the kneading operation will not be performed continuously (step S11: No), the kneading machine 10 is stopped (step S12), and the kneading operation ends. Note that amounts of change in the amount of water supplied and the CB value are fed back to the next amount of supplied water, and the accuracy of the next and subsequent amounts of supplied water is increased.

Sand Weighing

Next, a sand weighing method will be described in detail. FIG. 14 is a flow chart illustrating a sand weighing method. First, simultaneously with the activation of the kneading machine 10, the weight of the green sand in the weighing hopper 3 is measured using a sand weighing means (not shown) provided to the weighing hopper 3, and it is checked that the inside of the weighing hopper 3 is empty (step S101). The kneading control device 11 that has received an empty signal from the weighing hopper 3 operates the sand loading means 39 provided to the weighing hopper 3 and loads green sand into the weighing hopper 3 (step S102). Next, the sand weighing means weighs and stores the green sand (step S103). Note that weighing methods of green sand include, for example, weighing using a load cell, timer weighing, and weighing using a level meter. After the weighing of the green sand is completed, the weighing hopper 3 sends a weighing-complete signal to the kneading control device 11.

Next, once the kneading control device 11 receives the weighing-complete signal from the weighing hopper 3, the kneading control device 11 measures the moisture content of the green sand that was loaded using the moisture sensor 8, and measures the temperature of the green sand that was loaded using the temperature sensor 9 (step S104). Next, the kneading control device 11 calculates the amount of supplied water on the basis of the moisture measurement value measured using the moisture sensor 8 and the temperature measurement value measured using the temperature sensor 9, and the amount of green sand stored in the weighing hopper 3 (step S105). Once the calculation of the amount of supplied water ends, one operation of sand weighing is completed (step S106).

Next, the kneading control device 11 determines whether or not the next sand weighing is to be continued (step S107). If the kneading control device 11 determines that the sand weighing will be continued (step S107: Yes), then the method returns to step S101 and the subsequent steps are repeated. If the kneading control device 11 determines that the sand weighing will not be continued (step S107: No), the sand weighing ends.

Water Supply Unit Operation

Next, the operation of the water supply unit by the water supply unit 7 will be described in detail. FIG. 15 is a flow chart illustrating an operation method of the water supply unit 7. First, once the kneading machine 10 is activated, the water supply control device 14 determines whether or not the amount of water in the water supply tank 15 is at full by means of the full level meter 17 (step S1001). If the water supply control device 14 determines that the amount of water in the water supply tank 15 is not at full (step S1001: No), the water supply control device 14 instructs the water supply valve 16 to open, and then the water supply valve 16 is opened and supply of water to the water supply tank 15 is initiated (step S1002). Next, once the amount of water in the water supply tank 15 is at full (step S1003), the water supply control device 14 instructs the water supply valve 16 to close, and then the water supply valve 16 closes (step S1004) and the method proceeds to step S1005.

If the water supply control device 14 determines that the amount of water in the water supply tank 15 is at full (S1001: Yes), the method proceeds to step S1005.

In step S1005, once the water supply control device 14 of the water supply unit 7 receives the water-supply request signal, the water supply control device 14 initiates the water supply operation. Accordingly, the steps from S1001-S1004 in FIG. 15 are actions actually carried out by the water supply unit 7 during steps S1-S5 in FIG. 13. Step S1005 and the subsequent steps in FIG. 15 correspond to actions carried out at step S6 in FIG. 13.

In step S1005, once the water supply control device 14 receives the water-supply request signal, the water supply control device 14 instructs the pressurizing valve 18 to open, and then compressed air is supplied to the water supply tank 15 and the inside of the water supply tank 15 is pressurized (step S1006). Next, the water supply control device 14 instructs the small water supply valve 19 and the large water supply valve 20 to open, and then the small water supply valve 19 and the large water supply valve 20 are opened and supply of water to the kneading machine 10 is initiated (step S1007).

Once the amount of water added up by the digital flow meter 21 reaches the predetermined amount that was calculated (step S1008), the water supply control device 14 instructs the small water supply valve 19 and the large water supply valve 20 to close, and then the small water supply valve 19 and the large water supply valve 20 are closed and the supply of water to the kneading machine 10 ends (step S1009). After the water supply operation is completed, the water supply control device 14 instructs the pressurizing valve 18 to close, compressed air is discharged from the water supply tank 15, and the pressure inside the water supply tank 15 returns to the pre-pressurization state (step S1010).

Next, the water supply control device 14 determines whether or not the kneading machine 10 is running (step S1011). If the water supply control device 14 determines that the kneading machine 10 is running (step S1011: Yes), the method returns to step S1001, and continues to perform the operation of the water supply unit 7. If the water supply control device 14 determines that the kneading machine 10 is not running (step S1011: No), the water supply control device 14 ends the operation of the water supply unit 7.

Modified Examples

The moisture sensor support device 23 may be designed so as to automatically adjust the height of installation of the moisture sensor 8 (pair of electrodes 22) and the horizontal distance between the moisture sensors 8 (pair of electrodes 22) using a driving device, etc. in accordance with an instruction from the kneading control device 11. Similarly, the temperature sensor support device may be designed so as to automatically adjust the up-down position and horizontal position of the temperature sensor 9 using a driving device, etc. in accordance with an instruction from the kneading control device 11. The kneading control device 11 can send precise instructions to the moisture sensor support device 23 and the temperature sensor support device by taking into account the moisture measurement values measured by the moisture sensor 8.

In addition, in the present embodiment, the electrodes 22 have a measurement section at two locations, which are the upper electrode section 28 and the lower electrode section 29, but the measurement section is not limited to two locations. For example, the location of the measurement section can be configured to be one, or provided at three or more locations, because the length of the tip portion of the electrodes 22 changes in accordance with the amount of green sand loaded into the weighing hopper 3 and the size and shape of the weighing hopper 3, etc.

In addition, a moisture sensor may be separately provided in the kneading machine 10 and configured so as to be connected to the CB controller 6. Due to such a configuration, when the moisture content of kneaded sand in the kneading machine 10 is measured, if the moisture content is high, an instruction for instructing additional green sand loading can be sent from the kneading control device 11, which is connected to the CB controller 6, to the kneading unit 2, and if the moisture content is low, an instruction for instructing additional supply of water can be sent from the kneading control device 11, which is connected to the CB controller 6, to the water injection unit 7. Furthermore, it also becomes possible to measure moisture after kneading is completed and feed the result thereof back to the amount of supplied water for the next and subsequent batches.

In addition, the water supply and kneading system may not be provided with a CB controller 6. In this case, an operator directly measures the CB value. If this results in the kneaded sand not having a desired CB value, a supply-additional-water button added to the kneading machine 10 is manually pushed to open the small water supply valve 19 and/or the large water supply valve 20 again and additional water is supplied.

In this manner, according to the water supply and kneading system according to the present embodiment, it is possible to more appropriately control the amount of water supplied to green sand and produce kneaded sand having more stable properties by the kneading control device controlling the water supply and kneading system.

In addition, according to the water supply and kneading system according to the present embodiment, the ratio of green sand and water can be controlled with only a kneading control device, enabling installation without significantly modifying existing equipment.

REFERENCE SIGNS LIST

1 Water supply and kneading system
2 Kneading unit
3 Weighing hopper
4 Sand loading cylinder
5 Binding agent loading device
6 CB controller
7 Water supply unit
8 Moisture sensor
9 Temperature sensor
10 Kneading machine
11 Kneading control device
12 Moisture content calculating portion
13 Water supply device
14 Water supply control device
15 Water supply tank
16 Water supply valve
17 Full level meter
18 Pressurizing valve
19 Small water supply valve
20 Large water supply valve
21 Digital flow meter
22 Electrode
23 Moisture sensor support device
24 Upper electrode wiring connection
25 Lower electrode wiring connection
26 Upper electrode wiring connection member
27 Lower electrode wiring connection member
28 Upper electrode section
29 Lower electrode section
30 Upper electrode conductive member
31 Lower electrode conductive member (shaft component)
32 Insulating member
33 Nut
34 Rectangular-wave constant-current supplying means
35 Switch
36 Voltage smoothing and measuring means
37 Voltage value correcting means
38 Moisture content calculating means

The invention claimed is:
1. A water supply and kneading system for green sand, comprising:
   a weighing hopper that stores green sand that has been weighed;
   a kneading machine that kneads the green sand and water;
   a sand loading means for releasing the green sand in the weighing hopper into the kneading machine, or shutting off the release of the green sand;
   a water supply device that supplies water to the green sand in the kneading machine;

a moisture sensor that comprises a pair of rod-shaped electrodes and measures a moisture content of the green sand stored in the weighing hopper by measuring an electric potential difference between the electrodes; and a kneading control device that controls an amount of water supplied by the water supply device and controls the sand loading means on the basis of an output of the moisture sensor, wherein a moisture sensor support device is provided on top of the weighing hopper, each of the pair of electrodes being suspended downward from the moisture sensor support device so as to be embedded in the green sand while spaced apart from each other in a horizontal direction, and the pair of electrodes are configured such that the relative positions of the electrodes are freely adjusted in a horizontal direction, and are configured to be freely raised and lowered in an up-down direction.

2. The water supply and kneading system for green sand according to claim 1, further comprising:

a water supply control device that controls the water supply device, wherein the kneading control device at least transmits a sand-load signal to the sand loading means instructing the sand loading means to open, and a water-supply request signal to the water supply device providing instructions regarding supply of water and the amount of supplied water.

3. The water supply and kneading system for green sand according to claim 1, wherein the electrodes each comprise (i) a tip portion including a measurement section and an insulating portion, and (ii) a nut that secures the measurement section and the insulating portion, and the tip portion is a single integrated portion, and the tip portion is configured to be removed by loosening the nut.

4. The water supply and kneading system for green sand according to claim 3, wherein the measurement section is provided at a plurality of locations.

5. The water supply and kneading system for green sand according to claim 1, wherein the moisture sensor is provided at a plurality of locations in the weighing hopper.

6. The water supply and kneading system for green sand according to claim 1, further comprising a temperature sensor that measures a temperature of the green sand stored in the weighing hopper.

7. The water supply and kneading system for green sand according to claim 1, wherein the kneading control device further comprises a moisture content calculating portion that calculates a moisture content of the green sand from a measurement value of the moisture sensor and a measurement value of the temperature sensor.

8. The water supply and kneading system for green sand according to claim 1, wherein the water supply device comprises a digital flow meter and two water supply systems of a high flow rate and a low flow rate.

9. The water supply and kneading system for green sand according to claim 1, wherein the water supply device further comprises a water supply tank in which water has been stored.

10. The water supply and kneading system for green sand according to claim 1, further comprising a CB (compactability) controller that measures a CB (compactability) value of sand that has been kneaded, wherein the kneading control device instructs the water supply control device to supply additional water on the basis of a measurement value of the CB controller.

11. The water supply and kneading system for green sand according to claim 1, further comprising a binding agent loading device that releases a binding agent into the kneading machine.

12. The water supply and kneading system for green sand according to claim 1, wherein the support device includes a plurality of slots which allow for the relative positions of the electrodes to be freely adjusted in the horizontal direction.

* * * * *